(12) United States Patent
Sato

(10) Patent No.: US 12,045,528 B2
(45) Date of Patent: Jul. 23, 2024

(54) PRINTER FOR DISPLAYING MESSAGE FOR PROMPTING SUBSCRIPTION TO SERVICE, AND NON-TRANSITORY COMPUTER-READABLE RECORDING MEDIUM STORING COMPUTER-READABLE INSTRUCTIONS FOR PRINTER

(71) Applicant: Brother Kogyo Kabushiki Kaisha, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/180,186

(22) Filed: Mar. 8, 2023

(65) Prior Publication Data

US 2023/0315347 A1    Oct. 5, 2023

(30) Foreign Application Priority Data

Mar. 30, 2022  (JP) .............................. 2022-055700 A

(51) Int. Cl.
  *G06F 3/12*  (2006.01)
  *H04N 1/34*  (2006.01)

(52) U.S. Cl.
  CPC .......... *G06F 3/1273* (2013.01); *G06F 3/1204* (2013.01); *G06F 3/1207* (2013.01); *G06F 3/1231* (2013.01); *H04N 1/344* (2013.01)

(58) Field of Classification Search
  CPC ............................ G06F 3/1273; H04N 1/344
  See application file for complete search history.

(56) References Cited

U.S. PATENT DOCUMENTS

| | | | |
|---|---|---|---|
| 7,715,030 B2 * | 5/2010 | Higashiura | G06K 15/00 358/1.14 |
| 11,106,402 B2 * | 8/2021 | Tanaka | G06F 3/1292 |
| 2007/0162480 A1 * | 7/2007 | Garg | G03G 15/5079 |
| 2017/0161719 A1 * | 6/2017 | Bhatia | G06Q 20/327 |
| 2020/0225885 A1 | 7/2020 | Akimoto et al. | |

FOREIGN PATENT DOCUMENTS

| | | |
|---|---|---|
| JP | 2004-342023 A | 12/2004 |
| JP | 2020-111023 A | 7/2020 |
| WO | WO-2013151535 A1 * 10/2013 ......... G06Q 30/0224 |

* cited by examiner

*Primary Examiner* — Barbara D Reinier
(74) *Attorney, Agent, or Firm* — KENEALY VAIDYA LLP

(57) ABSTRACT

In a case where a first print execution instruction including first user identification information is received from a first terminal device, a printer may execute printing and determine whether a usage amount of the printer by a first user identified by the first user identification information is equal to or greater than a predetermined amount by using first print history information in association with the first user identification information. In a case where it is determined that the usage amount of the printer by the first user is equal to or greater than the predetermined amount, the printer may display a first screen. In a case where it is determined that the usage amount of the printer by the first user is less than the predetermined amount, the first screen is not displayed.

12 Claims, 6 Drawing Sheets

FIG. 4
Heavy In-Printing Screen SC1
Printing in Progress
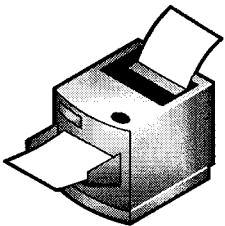
<Notice>
If you subscribe to the service, you can reduce printing cost.
Light In-Printing Screen SC2
Printing in Progress
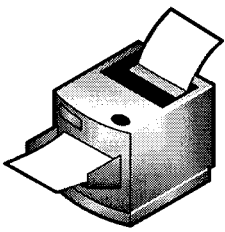
Heavy Printing Completion Screen SC3
Access to Registration Screen
<Notice>
If you subscribe to the service, you can reduce printing cost.

PRINTER FOR DISPLAYING MESSAGE FOR PROMPTING SUBSCRIPTION TO SERVICE, AND NON-TRANSITORY COMPUTER-READABLE RECORDING MEDIUM STORING COMPUTER-READABLE INSTRUCTIONS FOR PRINTER

REFERENCE TO RELATED APPLICATIONS

This application claims priority to Japanese Patent Application No. 2022-55700 filed on Mar. 30, 2022. The entire content of the priority application is incorporated herein by reference.

BACKGROUND ART

A printer is known that displays a screen that recommends a toner delivery contract in response to detecting that a toner remaining amount is low.

DESCRIPTION

The disclosure herein provides a technology for prompting a user to subscribe to a printer-related service according to a different approach than conventional ones.

A printer disclosed herein may comprise a display unit; a print execution unit; a memory configured to store, for each of one or more pieces of user identification information, the user identification information and print history information in association with each other; and a controller. The controller may be configured to: in a case where a first print execution instruction including first user identification information is received from a first terminal device, cause the print execution unit to execute first printing according to the first print execution instruction; in the case where the first print execution instruction is received from the first terminal device, determine whether a usage amount of the printer by a first user identified by the first user identification information is equal to or greater than a predetermined amount by using first print history information stored in the memory in association with the first user identification information included in the first print execution instruction; and in a case where it is determined that the usage amount of the printer by the first user is equal to or greater than the predetermined amount, display a first screen on the display unit, the first screen including a first message that prompts to subscribe to a service related to the printer, wherein in a case where it is determined that the usage amount of the printer by the first user is less than the predetermined amount, the first screen is not displayed on the display unit.

According to the configuration above, the printer displays the first screen in the case where the usage amount of the printer by the first user is high, that is, in the case where the first user is a so-called heavy user. Thus, the printer can efficiently prompt the heavy user to subscribe to the service. To the contrary, the printer does not display the first screen in the case where the usage amount of the printer by the first user is low, that is, in the case where the first user is a light user. Thus, the printer can refrain from making the light user feel bothered by the display of the first screen.

Computer-readable instructions for implementing the printer above and a non-transitory computer-readable recording medium storing the computer-readable instructions are also novel and useful. Further, a method performed by the printer above is also novel and useful.

FIG. 4 illustrates screens that can be displayed at the printer.

EMBODIMENTS

Figure 1:
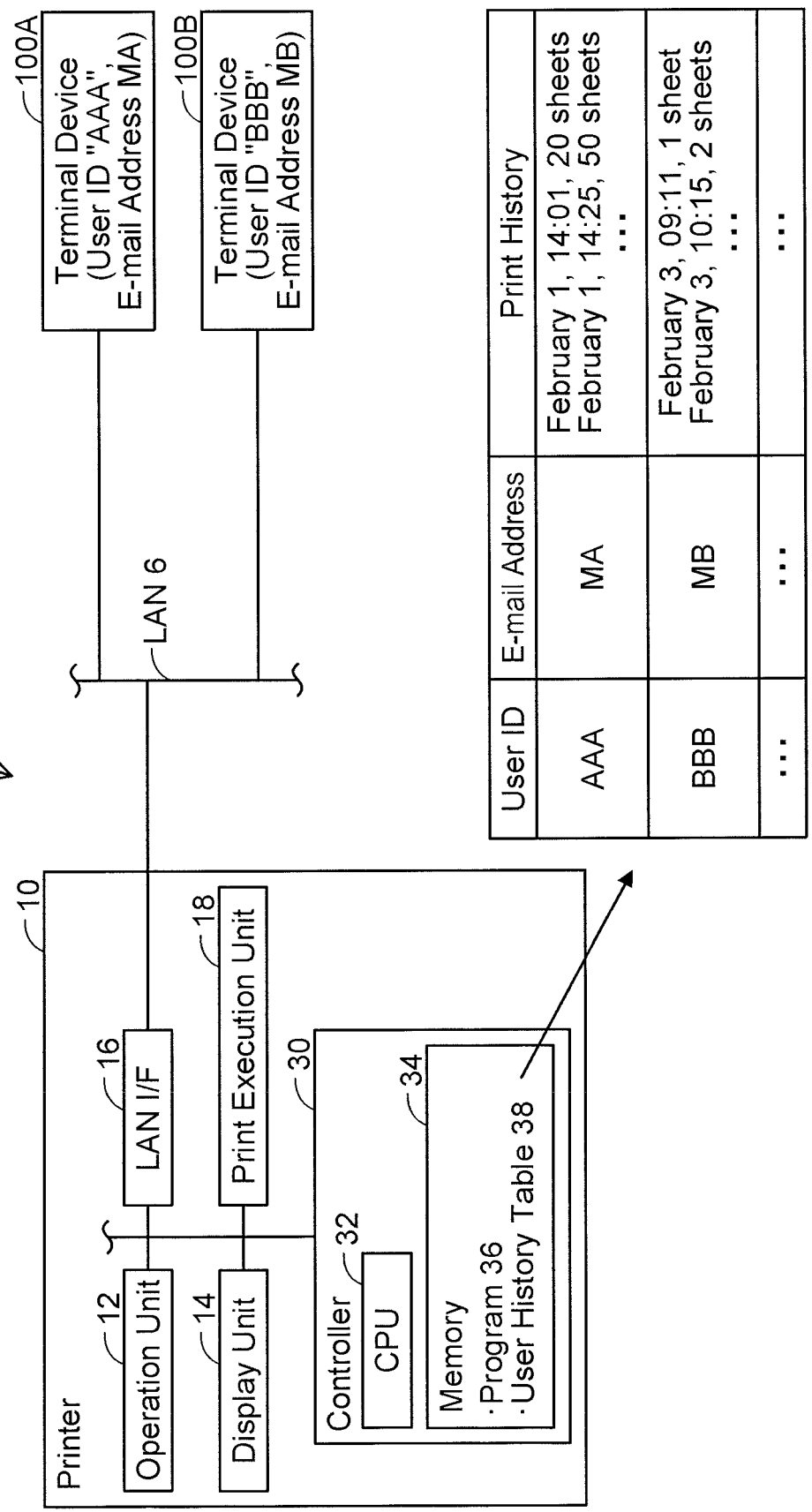
FIG. 1 illustrates a configuration of a communication system.

First Embodiment (Configuration of Communication System 2; FIG. 1)

As illustrated in FIG. 1, a communication system 2 includes a printer 10 and a plurality of terminal devices 100A, 100B. The devices 10, 100A, 100B are connected to a local area network (LAN) 6 and are communicable with each other via the LAN 6. The LAN 6 may be a wired LAN or a wireless LAN.

(Configuration of Printer 10)

The printer 10 is a peripheral device (e.g., a peripheral device of the terminal devices 100A, 100B) configured to execute a print function. In a modification, the printer 10 may be a multifunctional device configured to execute a scan function, a FAX function, etc. in addition to the print function. The printer 10 includes an operation unit 12, a display unit 14, a LAN interface 16, a print execution unit 18, and a controller 30. The units 12 to 30 are connected to a bus line (reference sign omitted).

The operation unit 12 includes a plurality of keys. A user can input various instructions to the printer 10 by operating the operation unit 12. The display unit 14 is a display that allows various information to be displayed thereon. The display unit 14 functions also as a so-called touch screen (i.e., as an operation unit accepting operations from the user). The LAN interface 16 is connected to the LAN 6. The print execution unit 18 includes a print mechanism of inkjet scheme, laser scheme, or the like.

The controller 30 includes a CPU 32 and a memory 34. The CPU 32 executes various processes according to a program 36 stored in the memory 34. The memory 34 is configured of a volatile memory, a non-volatile memory, etc. The memory 34 stores a user history table 38 in addition to the program 36.

The user history table 38 stores user IDs, e-mail addresses, and print history information in association with each other. Each user ID is information for identifying a user, such as a user of the terminal device 100A. Each e-mail address is an e-mail address of the user identified by the corresponding user ID. The user IDs and the email addresses are inputted to the printer 10 by users. For example, the user IDs, etc. may be inputted to the printer 10 by the operation unit 12 of the printer 10 being operated. Alternatively, for example, the user IDs, etc. may be inputted to the printer 10 by the user IDs, etc. being sent from the terminal devices 100A, 100B to the printer 10 while the terminal devices 100A, 100B are accessing a webserver in the printer 10. Each print history information indicates a history of printing executed according to instructions from the user identified by the corresponding user ID. Each print history information includes date and time at which printing was executed (which will be termed "printing timestamp" hereinafter) and the number of sheets consumed by the printing (which will be termed "the number of printed sheets" hereinafter).

(Configurations of Terminal Devices 100A, 100B)

The terminal device 100A is a user terminal such as a desktop PC, a laptop PC, a tablet PC, a cell phone (e.g., a smartphone), or the like. The terminal device 100A stores a user ID "AAA" for identifying a user of the terminal device 100A. The user ID may be set by the user after he/she obtains the terminal device 100A or may be stored in advance in the terminal device 100A before the terminal device 100A is shipped. The terminal device 100A includes an e-mailer (not illustrated), and an e-mail address MA of the user of the terminal device 100A is set in the e-mailer.

The terminal device 100B is the same as the terminal device 100A except that the terminal device 100B stores a user ID "BBB" and an e-mail address MB is set therein.

Figure 2:
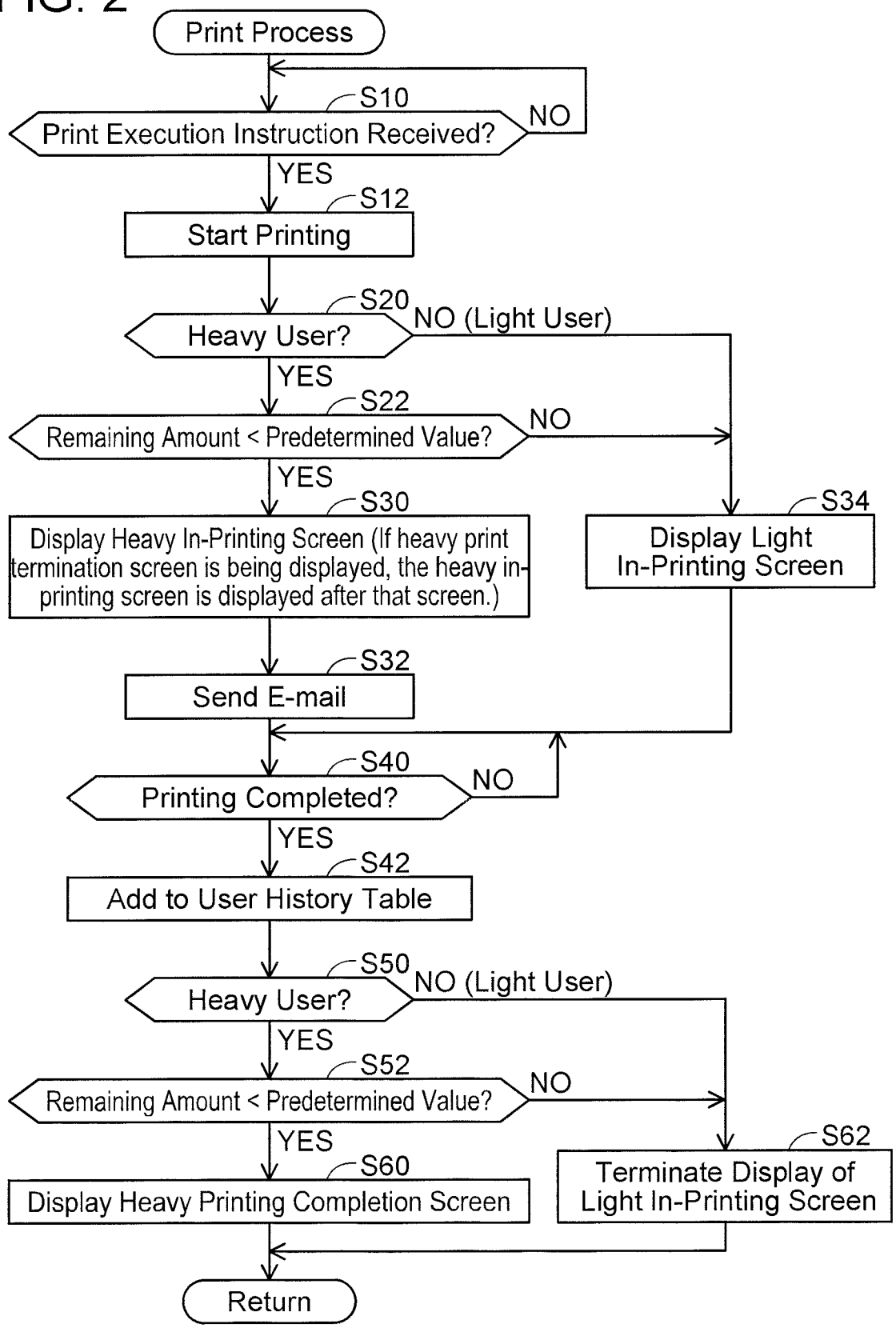
FIG. 2 illustrates a flowchart of a print process by a printer.

(Print Process by Printer 10: FIG. 2)

Referring to FIG. 2, a print process executed by the CPU 32 of the printer 10 is described. The process of FIG. 2 is executed with the printer 10 being turned on as its trigger.

In S10, the CPU 32 monitors whether a print execution instruction is received from a terminal device (e.g., 100A). When receiving a print execution instruction from a terminal device, the CPU 32 determines YES in S10 and proceeds to S12. The print execution instruction includes a user ID stored in the terminal device and print data representing an image to be printed. Hereinafter, this user ID and print data will be termed "target user ID" and "target print data", respectively.

In S12, the CPU 32 supplies the target print data to the print execution unit 18 and causes the print execution unit 18 to start printing the image.

By using the obtained print history information, the CPU 32 specifies the number of uses of the printer 10 by the target user within a predetermined period (e.g., a week), which is from a certain point of time in the past to the present. The number of uses corresponds to the number of printing timestamps within the predetermined period. When the specified number of uses is less than a predetermined threshold (e.g., 30 times), the CPU 32 determines that the target user is a light user (NO in S20) and proceeds to S34. The predetermined period may be shorter or longer than one week. Further, the predetermined threshold may be less or greater than 30 times.

When the specified number of uses is greater than the predetermined threshold, the CPU 32 specifies, by using the obtained print history information, the number of printed sheets by the target user within the predetermined period. The number of printed sheets here is a sum of the respective numbers of printed sheets within the predetermined period. When the specified number of printed sheets is less than a predetermined threshold (e.g., 200 sheets), the CPU 32 determines that the target user is a light user (NO in S20) and proceeds to S34. When the specified number of printed sheets is equal to or greater than the predetermined threshold, the CPU 32 determines that the target user is a heavy user (YES in S20) and proceeds to S22. The predetermined threshold may be less or greater than 200 sheets.

As described, the printer 10 determines whether the target user is a heavy user or a light user based on the number of uses by the target user within the predetermined period and the number of printed sheets by the targe user within the predetermined period. The printer 10 can thus properly determine whether the target user is a heavy user or a light user.

In S22, the CPU 32 determines whether a remaining amount of color material in a color material cartridge (e.g., an ink cartridge, a toner cartridge) currently mounted in the printer 10 is less than a predetermined value. The print execution unit 18 includes a sensor (not illustrated) configured to detect a remaining amount of color material in a color material cartridge. When the remaining amount indicated by a detected value from the sensor is less than the predetermined value, the CPU 32 determines YES in S22 and proceeds to S30, whereas when the remaining amount is equal to or greater than the predetermined value, the CPU 32 determines NO in S22 and proceeds to S34.

In S30, the CPU 32 displays a heavy in-printing screen on the display unit 14. As illustrated in FIG. 4, the heavy in-printing screen SC1 includes an in-printing image that indicates printing by the printer 10 is in progress. In this specification, a situation in which printing is in progress will be termed "in-printing". The heavy in-printing screen SC1 further includes a message that prompts subscription to a service related to the printer 10. In the present embodiment, this service is a subscription service, more specifically, a flat-rate printing service. With the flat-rate printing service, users are permitted to print unlimitedly or up to a predetermined limited number of sheets within a predetermined period (e.g., one month) in exchange for paying a flat-rate fee for the predetermined period.

In S32, the CPU 32 sends an e-mail. Specifically, the CPU 32 obtains the e-mail address associated with the target user ID from the user history table 38. The CPU 32 then sends an e-mail with the obtained e-mail address as its recipient e-mail address. The body of the e-mail includes, for example, the same message as the one included in the heavy in-printing screen. In a modification, the body of the e-mail may include a message different from the one included in the heavy in-printing screen (e.g., a message about details of the service, etc.). The body of the e-mail further includes the Uniform Resource Locator (URL) of a website for subscription to the service. In a modification, the body of the e-mail may not include the URL. As described, when the user who is the sender of the print execution instruction is a heavy user (YES in S20), the printer 10 sends the e-mail including the message that prompts subscription to the service (S32). The printer 10 can thus efficiently prompt the heavy user to subscribe to the service.

In S34, the CPU 32 displays a light in-printing screen on the display unit 14. As illustrated in FIG. 4, the light in-printing screen SC2 includes an in-printing image that indicates printing by the printer 10 is in progress. The light in-printing screen SC2 does not include the message that prompts subscription to the service related to the printer 10.

As described, when the user who is the sender of the print execution instruction is a heavy user (YES in S20), the printer 10 displays the heavy in-printing screen SC1 including the in-printing image and the message that prompts subscription to the service (S30). The printer 10 can thus efficiently prompt the heavy user to subscribe to the service. Especially, the printer 10 starts displaying the heavy in-printing screen SC1 before the printing is completed. Thus, the printer 10 can efficiently prompt the heavy user to subscribe to the service while the heavy user is waiting for the printing to be completed in front of the printer 10. To the contrary, when the user is a light user (NO in S20), the printer 10 displays the light in-printing screen SC2 (S34) rather than the heavy in-printing screen SC1. The printer 10 can thus refrain from making the light user feel bothered by the display of the heavy in-printing screen SC1 (i.e., the message that prompts subscription to the service).

Especially, when the user is a heavy user (YES in S20) and the remaining amount of color material in the color material cartridge is less than the predetermined value (YES in S22), the printer 10 displays the heavy in-printing screen SC1 (S30). When the remaining amount of color material in the color material cartridge is less than the predetermined value, it is highly probable that the user will purchase a new color material cartridge. The printer 10 displays the heavy in-printing screen SC1 when a new color material cartridge is expected to be purchased in the near future and thus can efficiently prompt the heavy user to subscribe to the service. To the contrary, when the user is a heavy user (YES in S20) and the remaining amount of color material in the color material cartridge is equal to or greater than the predetermined value (NO in S22), the printer 10 does not display the heavy in-printing screen SC1 but displays the light in-printing screen SC2 (S34). The printer 10 does not display the heavy in-printing screen SC1 when a new color material cartridge is not expected to be purchased in the near future and thus can refrain from making the heavy user feel bothered by the display of the heavy in-printing screen SC1 (i.e., the message that prompts subscription to the service).

In S40, the CPU 32 monitors whether the printing has been completed. When the printing is completed, the CPU 32 determines YES in S40 and proceeds to S42.

In S42, the CPU 32 updates the user history table 38. Specifically, the CPU 32 adds, to the print history information associated with the target user ID, the present date and time as a new printing timestamp as well as the number of printed sheets used for the print data included in the print execution instruction of S10. As a result, a new combination of the new printing timestamp and the number of printed sheets is added to the print history information associated with the target user ID.

S50 and S52 are the same as S20 and S22. When determining YES in S50, the CPU 32 proceeds to S52, whereas when determining NO in S50, the CPU 32 proceeds to S62. When determining YES in S52, the CPU 32 proceeds to S60, whereas when determining NO in S52, the CPU 32 proceeds to S62.

In S60, the CPU 32 displays a heavy printing completion screen on the display unit 14. As illustrated in FIG. 4, the heavy printing completion screen SC3 includes a message that prompts subscription to the service related to the printer 10 and a QR Code obtained by coding the URL of the website for subscription to the service. Here, "QR Code" is a registered trademark of DENSO WAVE INCORPORATED. The message is the same as the one included in the heavy in-printing screen SC1. In a modification, this message may be different from the one included in the heavy in-printing screen SC1. For example, a simple message, such as "Subscription to the service is recommended", may be displayed in large font size and/or in an eye-catching color (e.g., red). When S60 is completed, the CPU 32 returns to S10.

In S62, the CPU 32 terminates the display of the light in-printing screen. When S62 is completed, the CPU 32 returns to S10.

As described, when the user who is the sender of the print execution instruction is a heavy user (YES in S50), the printer 10 displays the heavy printing completion screen SC3 (S60). The printer 10 can thus efficiently prompt the heavy user to subscribe to the service. Especially, the printer 10 displays the heavy printing completion screen SC3 after the printing is completed. The printer 10 can thus efficiently prompt the heavy user to subscribe to the service when he/she comes to the printer 10 to collect the printed sheets after the printing is completed. Further, since the heavy printing completion screen SC3 includes the QR Code, the printer 10 can prompt the heavy user to access the website for subscription to the service. To the contrary, when the user is a light user (NO in S50), the printer 10 does not display the heavy printing completion screen SC3 but terminates the display of the light in-printing screen SC2 (S62). The printer 10 can thus refrain from making the light user feel bothered by the display of the heavy printing completion screen SC3 (i.e., the message that prompts subscription to the service).

Figure 3:
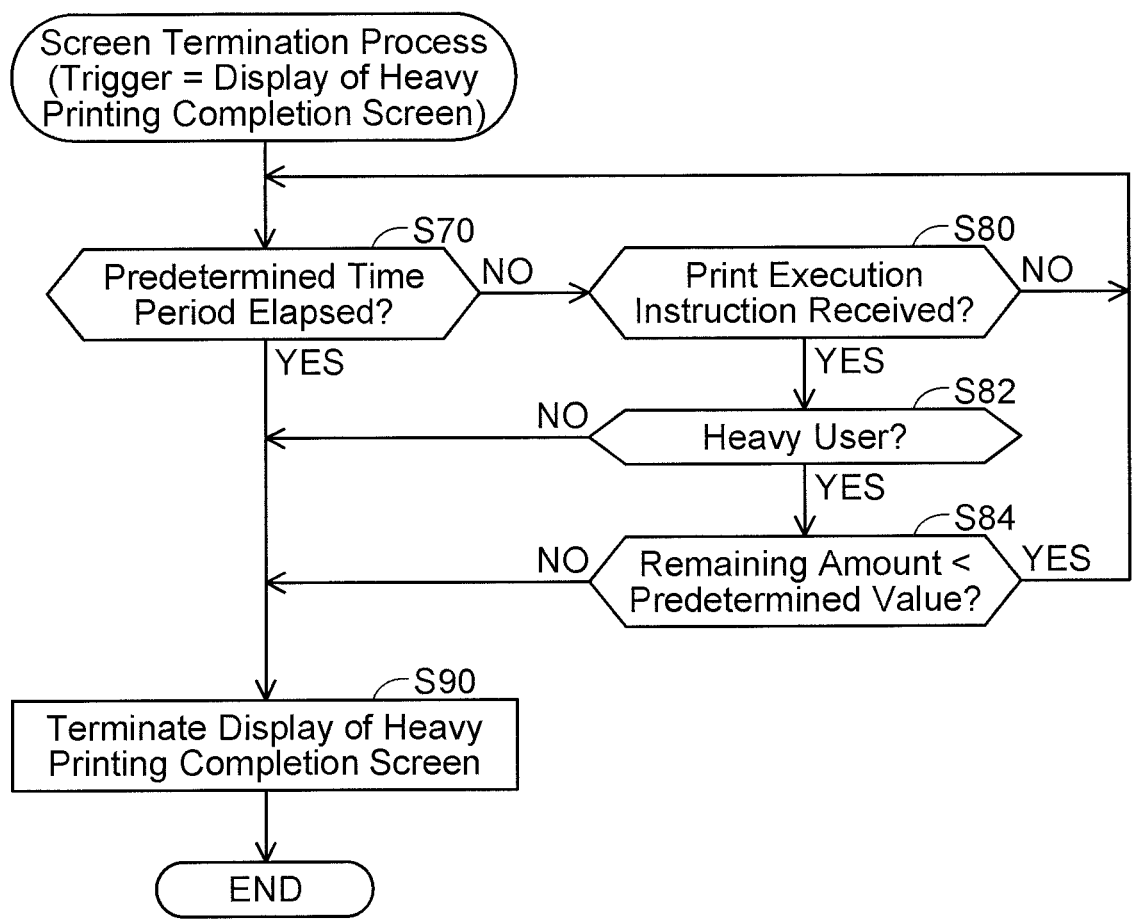
FIG. 3 illustrates a flowchart of a screen termination process by the printer.

(Screen Termination Process: FIG. 3)

Referring to FIG. 3, a screen termination process executed by the CPU 32 of the printer 10 is described. The process of FIG. 3 is initiated in response to the heavy printing completion screen SC3 being displayed in S60 of FIG. 2.

In S70, the CPU 32 monitors whether a predetermined period has elapsed since the heavy printing completion screen was displayed. When the predetermined period elapses, the CPU 32 determines YES in S70 and proceeds to S90.

In parallel with the monitoring of the passage of predetermined period in S70, the CPU 32 monitors whether a print execution instruction is received from a terminal device (e.g., 100A) in S80. When a print execution instruction is received from a terminal device, the CPU 32 determines YES in S80 and proceeds to S82. Hereinafter, a user ID included in the print execution instruction received here will be also termed "target user ID".

S82 and S84 are the same as S20 and S22 in FIG. 2. When determining YES in S82, the CPU 32 proceeds to S84, whereas when determining NO in S82, the CPU 32 proceeds to S90. When determining YES in S84, the CPU 32 returns to S70, whereas when determining NO in S84, the CPU 32 proceeds to S90.

In S90, the CPU 32 terminates the display of the heavy printing completion screen SC3. When S90 is completed, the process of FIG. 3 ends. As illustrated in connection with the process of FIG. 3, the present embodiment contemplates the situation where another print execution instruction is received (YES in S80) while the printer 10 is displaying the heavy printing completion screen SC3. When a user who is the sender of the other print execution instruction is a light user (NO in S82), the printer 10 terminates the display of the heavy printing completion screen SC3 (S90) before the predetermined period elapses (NO in S70). The printer 10 can thus refrain from making the light user feel bothered by the display of the heavy printing completion screen SC3 (i.e., the message that prompts subscription to the service). To the contrary, when the user is a heavy user (YES in S82), the printer 10 maintains the display of the heavy printing completion screen SC3 until the predetermined period elapses (YES in S70). The printer 10 can thus efficiently prompt the heavy user to subscribe to the service.

(Specific Cases)

Figure 5:
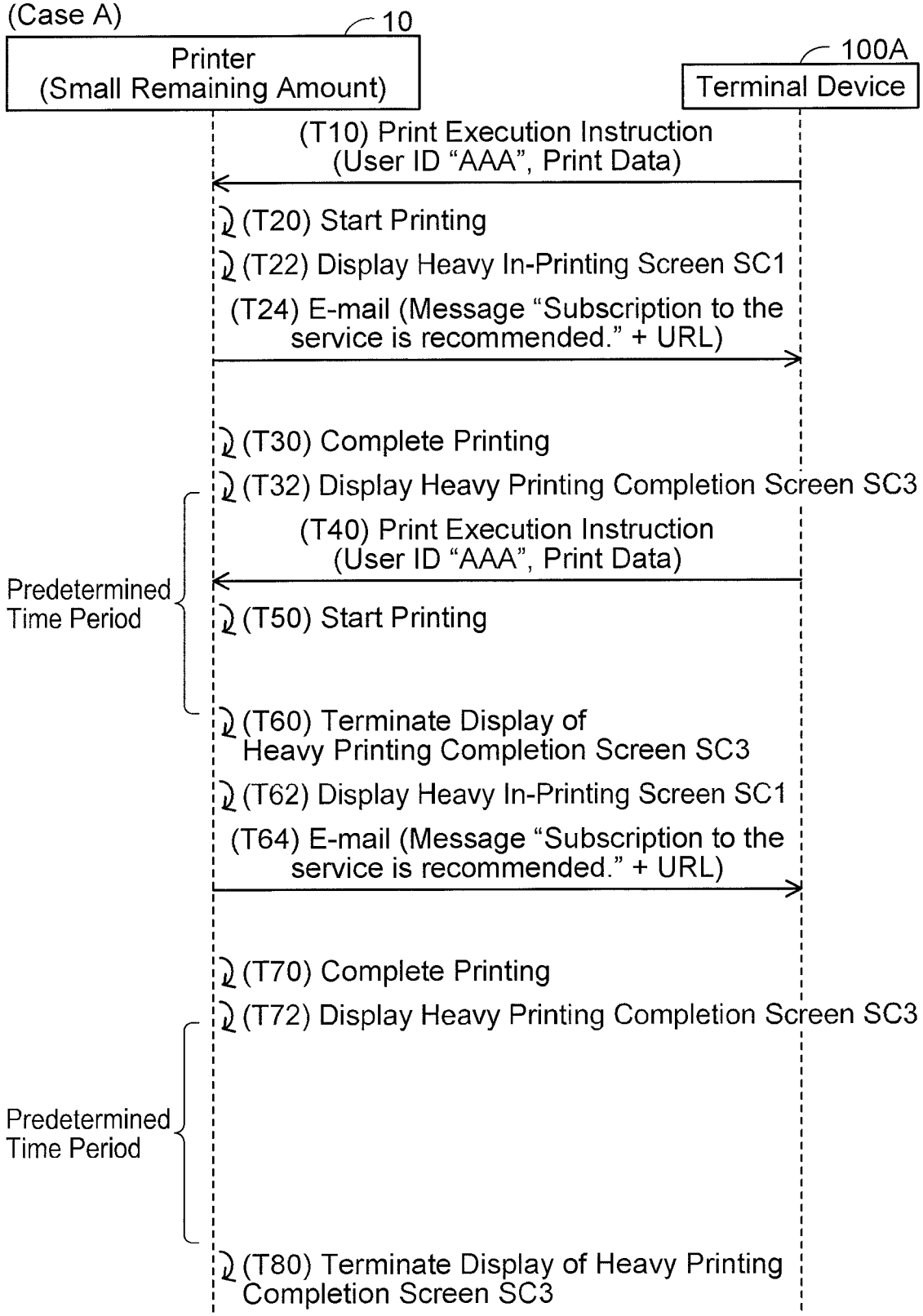
FIG. 5 illustrates a sequence diagram of Case A.
Figure 6:
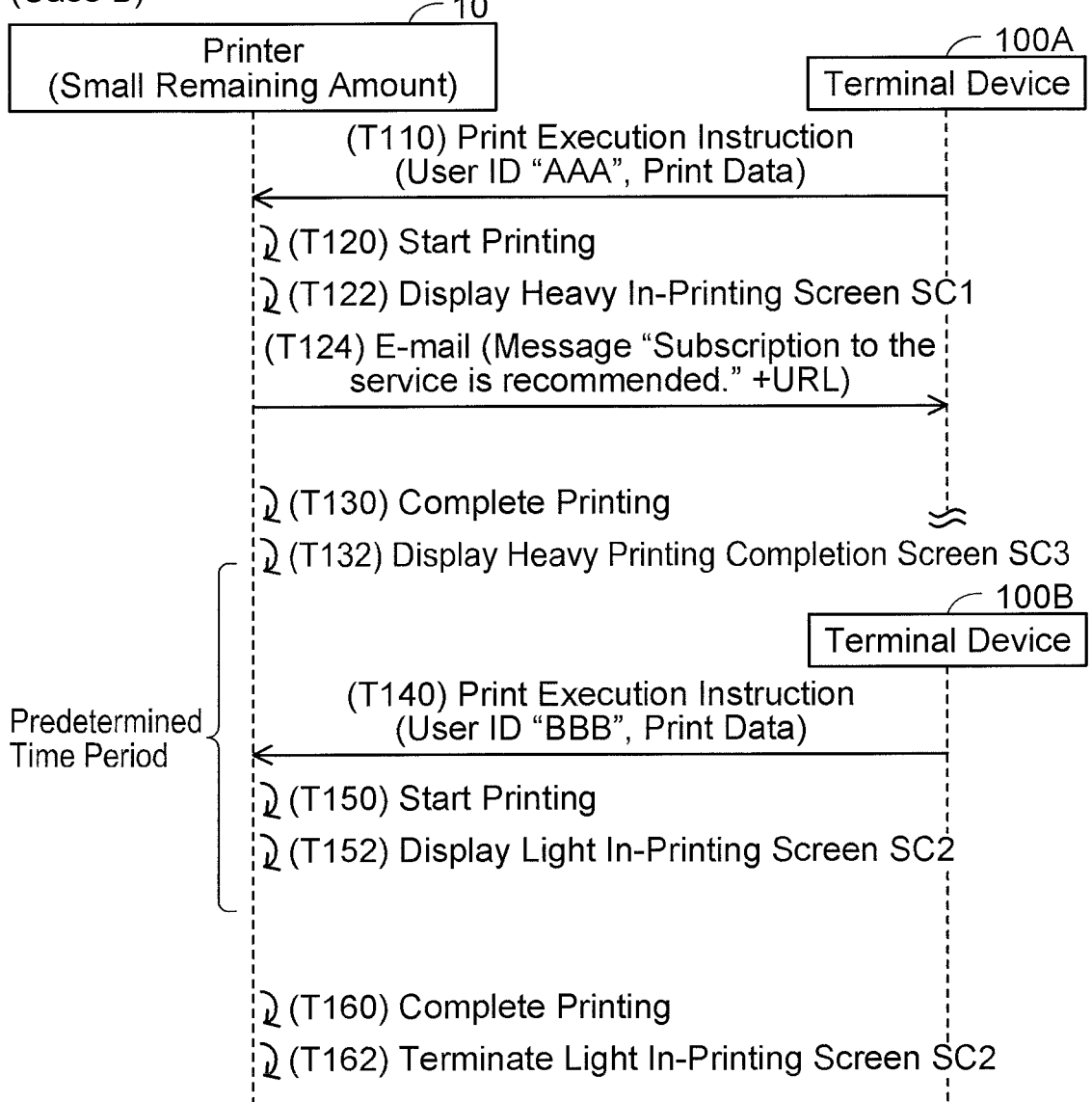
FIG. 6 illustrates a sequence diagram of Case B.

Referring now to FIGS. 5 and 6, specific cases implemented through the processes of FIGS. 2 and 3 are described. The user of the terminal device 100A is a heavy user, whereas the user of the terminal device 100B is a light user. FIG. 5 illustrates Case A where the heavy user (i.e., the terminal device 100A) sends a print execution instruction twice. FIG. 6 illustrates Case B where after the heavy user (i.e., the terminal device 100A) sends a print execution instruction, the light user (i.e., the terminal device 100B) sends a print execution instruction. In either case, the remaining amount of color material in the color material cartridge in the printer 10 is less than the predetermined value.

(Case A: FIG. 5)

In T10, the printer 10 receives a print execution instruction from the terminal device 100A (YES in S10 of FIG. 2). This print execution instruction includes the user ID "AAA"

and print data. In this instance, the printer 10 starts printing in T20 (S12) and displays the heavy in-printing screen SC1 in T22 (YES in S20, YES in S22, S30). Further, the printer 10 sends an e-mail with the e-mail address MA associated with the user ID "AAA" as its recipient e-mail address in T24 (S32). As a result, the e-mail is received and displayed by the terminal device 100A.

Once completing the printing in T30 (YES in S40), the printer 10 displays the heavy printing completion screen SC3 in T32 (YES in S50, YES in S52, S60). Then, before a predetermined period elapses since the start of the display of the heavy printing completion screen SC3, the printer 10 receives a print execution instruction from the terminal device 100A again in T40 (YES in S10, NO in S70 and YES in S80 in FIG. 3). In this instance, the printer 10 starts printing in T50 (S12), and maintains the display of the heavy printing completion screen SC3 without replacing the heavy printing completion screen SC3 with the heavy in-printing screen SC1 (YES in S20, YES in S22, the process described in the parentheses in S30, YES in S82, YES in S84). In a modification, the printer 10 may display the heavy in-printing screen SC1 in place of the heavy printing completion screen SC3 right after starting the printing in T50.

Once the predetermined period elapses since the start of the display of the heavy printing completion screen SC3 (YES in S70), the printer 10 terminates the display of the heavy printing completion screen SC3 in T60 (S90) and displays the heavy in-printing screen SC1 in T62 (as described in the parentheses in S30). Further, the printer 10 sends an e-mail with the e-mail address MA associated with the user ID "AAA" as its recipient e-mail address in T64 (S32).

When completing the printing in T70 (YES in S40), the printer 10 displays the heavy printing completion screen SC3 in T72 (YES in S50, YES in S52, S60). Then, once the predetermined period elapses since the start of the display of the heavy printing completion screen SC3 (YES in S70), the printer 10 terminates the display of the heavy printing completion screen SC3 in T80 (S90).

(Case B: FIG. 6)

T110 to T132 are the same as T10 to T32 in FIG. 5. Before the predetermined period elapses since the start of the display of the heavy printing completion screen, the printer 10 receives a print execution instruction from the terminal device 100B in T140 (YES in S10, NO in S70 and YES in S80 in FIG. 3). This print execution instruction includes the user ID "BBB" and print data. In this instance, the printer 10 starts printing in T150 (S12) and displays the light in-printing screen SC2 in place of the heavy printing completion screen SC3 in T152 (NO in S82, S90, NO in S20, S34).

When completing the printing in T160 (YES in S40), the printer 10 terminates the display of the light in-printing screen SC2 in T162 (NO in S50, S62).

(Effects of Present Embodiment)

According to the embodiment described above, when the usage amount of the printer 10 by the user of the terminal device 100A is large, that is, when the user is a heavy user, the printer 10 displays the heavy in-printing screen SC1 and the heavy printing completion screen SC3 (S30 and S60 in FIG. 2; T32, T62, and T72 in FIG. 5; T122 and T132 in FIG. 6). The printer 10 can thus efficiently recommend that the heavy user subscribe to the service. To the contrary, when the usage amount of the printer 10 by the user of the terminal device 100B is small, that is, when the user is a light user, the printer 10 does not display the heavy in-printing screen SC1 nor the heavy printing completion screen SC3 (S34, S62 in FIG. 2). The printer 10 can thus refrain from making the light user feel bothered by the display of the heavy in-printing screen SC1 and the heavy printing completion screen SC3.

The terminal device 100A is examples of "first terminal device" and "second terminal device" or the terminal device 100B is examples of "first terminal device" and "second terminal device". The user ID "AAA" is examples of "first user identification information" and "second user identification information" or the user ID "BBB" is examples of "first user identification information" and "second user identification information". The print execution instruction in T10 of FIG. 5 or the print execution instruction in T110 of FIG. 6 is an example of "first print execution instruction". The print execution instruction in T40 of FIG. 5 or the print execution instruction in T140 of FIG. 6 is an example of "second print execution instruction". The message and the image indicating that the printing is in progress that are included in the heavy in-printing screen SC1 in FIG. 4 are examples of "first message" and "in-printing information", respectively. The message and the QR Code included in the heavy printing completion screen SC3 are examples of "second message" and "URL information", respectively. The heavy in-printing screen SC1 and the heavy printing completion screen SC3 are examples of "first screen". The heavy printing completion screen SC3 is an example of "second screen". The message included in the e-mail sent in T24 or T64 of FIG. 5 or in T124 of FIG. 6 is an example of "predetermined message". Determining YES in S70 of FIG. 3 is an example of "predetermined display termination condition is satisfied".

S12 in FIG. 2 is an example of "cause the print execution unit to execute first printing". S20 and S50 are examples of "determine whether a usage amount of the printer by a first user identified by the first user identification information is equal to or greater than a predetermined amount". S30 and S60 are examples of "display a first screen on the display unit". S32 is an example of "send an e-mail". S60 is an example of "display a second screen". S82 in FIG. 3 is an example of "determine whether a usage amount of the printer by a second user identified by the second user identification information is equal to or greater than the predetermined amount". S90 is an example of "terminate the display of the first screen".

While specific examples of the present disclosure have been described above in detail, these examples are merely illustrative and place no limitation on the scope of the patent claims. The technology described in the patent claims also encompasses various changes and modifications to the specific examples described above. Modifications of the embodiment above will be listed below.

(Modification 1)

The "user identification information" is not limited to user IDs but may be another information for identifying users (e.g., e-mail addresses, etc.). Information for identifying terminal devices used by users can be also considered as information for identifying the users. For example, the "user identification information" may be a MAC address of a terminal device, an application ID assigned to an application (e.g., 38) of the terminal device, or a unique ID created by the application.

(Modification 2)

The "service" is not limited to the flat-rate printing service but may be another service. For example, the "service" may be a service of automatically shipping the color material cartridge, a service of supplying news information to the printer, or a service of using a server that is capable of special image processing on an image to be printed. Generally speaking, the "service" may be any service so long as it is related to the printer.

(Modification 3)

In the case of YES in S20 of FIG. 2, S30 may not be executed. Generally speaking, "display a first screen" may include that the display of the first screen on the display unit may not be started before the first printing is completed.

(Modification 4)

The heavy in-printing screen SC1 may not include the image indicating that the printing is in progress. Generally speaking, the "first screen" may not include the in-printing information.

(Modification 5)

In the case of YES in S50 of FIG. 2, S60 may not be executed. Generally speaking, "display a first screen" may include that the first screen is not displayed on the display unit after the first printing is completed. In this modification, "display a second screen" may be omitted.

(Modification 6)

The heavy printing completion screen SC3 may include a barcode obtained by coding a URL or a character string indicating a URL in place of the QR Code. Generally speaking, the "URL information" may be any information so long as it is obtained by using a URL of a website for subscription to the service. The heavy printing completion screen SC3 may not include the QR Code. Generally speaking, the "first screen" or the "second screen" may not include the URL information.

(Modification 7)

The "predetermined display termination condition" may not be that the predetermined period elapses since the start of the display of the heavy printing completion screen but may be, for example, that a display termination operation is performed by a user or that another print execution instruction is received from a terminal device. In another modification, S80 to S84 in FIG. 3 may not be executed. In this modification, "determine whether a usage amount of the printer by a second user identified by the second user identification information is equal to or greater than the predetermined amount" and "terminate the display of the first screen" may be omitted.

(Modification 8)

S22 and S52 in FIG. 2 may not be executed. Generally speaking, "display a first screen" may include displaying the first screen on the display unit in the case where it is determined that the usage amount of the printer by the first user is equal to or greater than the predetermined amount, regardless of whether the remaining amount of consumable article in the printer is less than a predetermined value.

(Modification 9)

S32 in FIG. 2 may not be executed. In this modification, "send an e-mail" may be omitted.

(Modification 10)

In S20 or S50 of FIG. 2 or in S82 of FIG. 3, the printer 10 may determine whether the target user is a heavy user or a light user only by using the number of printed sheets by the target user within the predetermined period, without using the number of uses of the printer 10 by the target user within the predetermined period. In another modification, the printer 10 may determine whether the target user is a heavy user or a light user only by using the number of uses of the printer 10 by the target user within the predetermined period, without using the number of printed sheets by the target user within the predetermined period. Generally speaking, the "usage amount" may suffice so long as it includes at least one of the number of uses of the printer within the predetermined period and the number of printed sheets within the predetermined period. In another modification, the printer 10 may determine whether the target user is a heavy user or a light user without using the number of uses of the printer 10 by the target user within the predetermined period nor the number of printed sheets within the predetermined period. For example, the printer 10 may determine whether the target user is a heavy user or a light user by using the cumulative number of uses of the printer 10 by the target user and/or the cumulative number of printed sheets without setting the predetermined period. The printer 10 may determine whether the target user is a heavy user or a light user without using the number of uses nor the number of printed sheets.

(Modification 11)

In the embodiment above, the processes of FIG. 2, FIG. 3, and FIG. 5 are implemented by the CPU 32 executing the program 36. Instead of this, at least one of the processes of FIG. 2, FIG. 3, and FIG. 5 may be implemented by hardware such as a logic circuit, etc.

What is claimed is:

1. A printer comprising:
   a display;
   a printing execution device;
   a memory configured to store, for each of one or more pieces of user identification information, the user identification information and print history information in association with each other; and
   a controller,
   wherein the controller is configured to:
   in a first case where a first print execution instruction is received from a first terminal device, determine whether a usage amount of the printer by a first user identified by first user identification information, included in the first print execution instruction, is equal to or greater than a predetermined amount by using first print history information stored in the memory in association with the first user identification information included in the first print execution instruction;
   in a first processing disposition, in the first case, where it is determined that the usage amount of the printer by the first user is equal to or greater than the predetermined amount, display a first screen on the display, the first screen including a first message that prompts subscription to a service related to the printer, and
   in a second processing disposition, in the first case, where it is determined that the usage amount of the printer by the first user is less than the predetermined amount, the first screen is not displayed on the display; and
   the controller is configured, with both the first processing disposition and the second processing disposition, in performing respective processing for such first processing disposition and second processing disposition, to:
   cause the printing execution device to execute first printing according to the first print execution instruction regardless of whether the usage amount of the printer by the first user is equal to or greater than the predetermined amount or not.

2. The printer as in claim 1, wherein
   the controller is configured to start displaying the first screen on the display before the first printing is completed.

3. The printer as in claim 2, wherein
   the first screen includes:
   the first message; and in-printing information indicating that the first printing is in progress.

4. The printer as in claim 2, wherein
the controller is further configured to:
in the first processing disposition, in the first case where it is determined that the usage amount of the printer by the first user is equal to or greater than the predetermined amount, display a second screen on the display after the first printing is completed, the second screen including a second message that prompts subscription to the service, and
in the second processing disposition, in the first case where it is determined that the usage amount of the printer by the first user is less than the predetermined amount, the second screen is not displayed on the display.

5. The printer as in claim 4, wherein
the second screen includes:
the second message; and
Uniform Resource Locator (URL) information obtained by using a URL of a website for subscription to the service.

6. The printer as in claim 1, wherein
the controller is configured to display the first screen on the display after the first printing is completed.

7. The printer as in claim 6, wherein
the first screen includes:
the first message; and
Uniform Resource Locator (URL) information obtained by using a URL of a website for subscription to the service.

8. The printer as in claim 6, wherein
the controller is further configured to:
in a second case where a second print execution instruction including second user identification information is received from a second terminal device after the first screen has been displayed, determine whether a usage amount of the printer by a second user identified by the second user identification information is equal to or greater than the predetermined amount by using second print history information stored in the memory in association with the second user identification information included in the second print execution instruction; and
in a third processing disposition, in the second case where it is determined that the usage amount of the printer by the second user is less than the predetermined amount, terminate the display of the first screen on the display before a predetermined display termination condition is satisfied, and
in a fourth processing disposition, in the second case where it is determined that the usage amount of the printer by the second user is equal to or greater than the predetermined amount, the display of the first screen on the display is maintained until the predetermined display termination condition is satisfied.

9. The printer as in claim 1, wherein
the controller is configured to:
in the first processing disposition, in the first case where it is determined that the usage amount of the printer by the first user is equal to or greater than the predetermined amount; and it is determined that a remaining amount of a consumable article in the printer is less than a predetermined value, display the first screen on the display; and
in a further case where it is determined that the usage amount of the printer by the first user is equal to or greater than the predetermined amount and it is further determined that the remaining amount of the consumable article in the printer is equal to or greater than the predetermined value, the first screen is not displayed on the display.

10. The printer as in claim 1, wherein
the memory is configured to store, for each of the one or more pieces of user identification information, the user identification information, the print history information, and an e-mail address of a user identified by the user identification information in association with each other, and
the controller is further configured to:
in the first processing disposition where it is determined that the usage amount of the printer by the first user is equal to or greater than the predetermined amount, send an e-mail including a predetermined message that prompts subscription to the service, wherein in the second processing disposition where it is determined that the usage amount of the printer by the first user is less than the predetermined amount, the e-mail is not sent.

11. The printer as in claim 1, wherein
the usage amount includes at least one of:
a number of uses of the printer within a predetermined period; and
a number of sheets printed within a predetermined period.

12. A non-transitory computer-readable recording medium storing computer-readable instructions for a printer, wherein the printer comprises:
a display;
a printing execution device;
a memory configured to store, for each of one or more pieces of user identification information, user identification information and print history information in association with each other; and
a processor,
wherein the computer-readable instructions, when executed by the processor, cause the printer to:
in a first case where a first print execution instruction including first user identification information is received from a first terminal device, cause the printing execution device to execute first printing according to the first print execution instruction;
in the first case where the first print execution instruction is received from the first terminal device, determine whether a usage amount of the printer by a first user identified by the first user identification information is equal to or greater than a predetermined amount by using first print history information stored in the memory in association with the first user identification information included in the first print execution instruction; and
in a first processing disposition, in the first case, where it is determined that the usage amount of the printer by the first user is equal to or greater than the predetermined amount, display a first screen on the display, the first screen including a first message that prompts subscription to a service related to the printer, and
in a second processing disposition, in the first case, where it is determined that the usage amount of the printer by the first user is less than the predetermined amount, the first screen is not displayed on the display; and
the processor is configured, with both the first processing disposition and the second processing disposition, in performing respective processing for such first processing disposition and second processing disposition, to in the first case where the first print execution instruction is received from the first terminal device, the printing execution device is caused to execute the first printing, according to the first print execution instruction, regardless of whether the usage amount of the printer by the first user is equal to or greater than the predetermined amount or not.

* * * * *